(12) United States Patent
Kim et al.

(10) Patent No.: US 9,764,334 B2
(45) Date of Patent: Sep. 19, 2017

(54) VEHICLE AIR PURIFYING APPARATUS FOR SIMULTANEOUSLY REDUCING HARMFUL GAS AND PARTICLES

(71) Applicant: KOREA INSTITUTE OF MACHINERY & MATERIALS, Daejeon (KR)

(72) Inventors: Hak Joon Kim, Daejeon (KR); Yong-Jin Kim, Daejeon (KR); Bangwoo Han, Seoul (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 270 days.

(21) Appl. No.: 14/708,647

(22) Filed: May 11, 2015

(65) Prior Publication Data
US 2016/0102589 A1    Apr. 14, 2016

(30) Foreign Application Priority Data
Oct. 14, 2014    (KR) .................. 10-2014-0138246

(51) Int. Cl.
*B03C 3/88* (2006.01)
*B03C 3/06* (2006.01)
(Continued)

(52) U.S. Cl.
CPC ............ *B03C 3/88* (2013.01); *B03C 3/06* (2013.01); *B03C 3/12* (2013.01); *B03C 3/155* (2013.01);
(Continued)

(58) Field of Classification Search
CPC ............ B03C 2201/10; B03C 2201/28; B03C 2201/30; B03C 3/06; B03C 3/12;
(Continued)

(56) References Cited

U.S. PATENT DOCUMENTS 2,825,102 A * 3/1958 Hicks .................. B03C 3/017
                                                      392/360
3,988,131 A * 10/1976 Kanazawa ............ B03C 3/155
                                                       55/318
(Continued)

FOREIGN PATENT DOCUMENTS

| JP | 11-216391 | 8/1999 | ............... B03C 3/66 |
| KR | 10-2003-0046982 | 6/2003 | ............. B01D 53/04 |

(Continued)

OTHER PUBLICATIONS

Office Action dated Jul. 22, 2015 issued by KIPO in KR 10-2014-0138246.

*Primary Examiner* — Christopher P Jones
(74) *Attorney, Agent, or Firm* — Harness, Dickey & Pierce, P.L.C.

(57) ABSTRACT

A vehicle air purifying apparatus is provided. The vehicle air purifying apparatus includes: a charger configured to discharge positive (+) ions or negative (−) ions to charge particles included in harmful gas; a removable collecting electrode configured to have positive (+) or negative (−) polarity to allow the particles charged by the charger to be attached thereto; and a filter configured to filter harmful gas and have positive (+) or negative (−) polarity, and the filter is formed in a tubular shape having an empty space therein and the removable collecting electrode is inserted into the filter.

11 Claims, 5 Drawing Sheets

(51) Int. Cl.
*B03C 3/12* (2006.01)
*B03C 3/155* (2006.01)
*B03C 3/36* (2006.01)
*B03C 3/41* (2006.01)
*B03C 3/49* (2006.01)
*F01N 3/08* (2006.01)
*F01N 3/28* (2006.01)

(52) U.S. Cl.
CPC ............. *B03C 3/368* (2013.01); *B03C 3/41* (2013.01); *B03C 3/49* (2013.01); *F01N 3/0828* (2013.01); *F01N 3/2803* (2013.01); *B03C 2201/10* (2013.01); *B03C 2201/28* (2013.01); *B03C 2201/30* (2013.01); *F01N 2570/08* (2013.01)

(58) Field of Classification Search
CPC ........... B03C 3/155; B03C 3/368; B03C 3/41; B03C 3/49; B03C 3/88; F01N 2570/08; F01N 3/0828; F01N 3/2803
See application file for complete search history.

(56) References Cited

U.S. PATENT DOCUMENTS

| | | | | |
|---|---|---|---|---|
| 4,066,526 A | * | 1/1978 | Yeh | B03C 3/155 204/554 |
| 4,227,446 A | * | 10/1980 | Sone | B03C 3/017 422/121 |
| 5,055,115 A | * | 10/1991 | Yikai | B01D 53/32 96/59 |
| 5,593,476 A | * | 1/1997 | Coppom | B03C 3/155 95/78 |
| 5,950,424 A | * | 9/1999 | Nojima | B03C 3/011 55/DIG. 30 |
| 6,034,354 A | * | 3/2000 | Hironaka | F24F 3/166 219/383 |
| 2004/0187681 A1 | * | 9/2004 | Kishioka | B03C 3/025 95/57 |
| 2005/0172816 A1 | * | 8/2005 | Son | B01D 46/0013 96/417 |
| 2009/0071328 A1 | * | 3/2009 | Dunn | B03C 3/09 95/62 |
| 2009/0277325 A1 | * | 11/2009 | Gottung | B01D 45/12 95/8 |

FOREIGN PATENT DOCUMENTS

| | | | |
|---|---|---|---|
| KR | 10-2005-0005748 | 1/2005 | |
| KR | 10-1087055 | 11/2011 | |
| KR | 10-1373720 | 3/2014 | ............. B03C 3/155 |

* cited by examiner

VEHICLE AIR PURIFYING APPARATUS FOR SIMULTANEOUSLY REDUCING HARMFUL GAS AND PARTICLES

CROSS-REFERENCE TO RELATED PATENT APPLICATION

This application claims priority from Korean Patent Application No. 10-2014-0138246, filed on Oct. 14, 2014 in the Korean Intellectual Property Office, the disclosure of which is incorporated herein by reference in its entirety.

FIELD

Apparatuses and methods consistent with the exemplary embodiments relate to a vehicle air purifying apparatus which can simultaneously reduce harmful gas and particles.

BACKGROUND

As environmental issues increasingly arise all over the world, regulations on harmful gas generated from a variety of pollution sources are being tightened. For example, in Korea, a law for tightening the regulations on ultrafine particles in vehicles will be enforced in 2015.

Gas from a pollution source such as a vehicle, a factory, a boiler, and the like include harmful gas which is harmful to the human body or causes environmental pollution, and fine particles like as granular material.

A related-art method for purifying air in vehicles uses a filter which is used in the vehicles. However, the filter rarely reduces harmful gas. In addition, an ionizer air cleaner is being sold, but is merely an ion generating device and lacks the capability of purifying.

Therefore, techniques for removing harmful gas and particles (in particular, fine particles) simultaneously and effectively are developing. For example, Korean Patent Registration Nos. 530973 and 623853 disclose that an activated carbon filter is installed at a front portion or a rear portion of an electrostatic precipitator to process harmful gas and fine particles. However, since the related-art methods require the electrostatic precipitator and the separate activated carbon filter, the size of the processing device increases. In addition, since the processing device has a complicated structure, the costs for installing and maintaining increase.

Korean Patent Registration No. 1087055 discloses an electrostatic precipitator which uses an activated carbon fiber filter which charges and processes particles simultaneously. However, though this electrostatic precipitator can be miniaturized, efficiency is low because it is difficult to apply high voltage to a discharge electrode and ozone generation rate is high.

SUMMARY

One or more aspects of the exemplary embodiments provide a vehicle air purifying apparatus which can reduce harmful gas and particles simultaneously.

One or more aspects of the exemplary embodiments also provide a vehicle air purifying apparatus which can reduce harmful gas and particles simultaneously without causing ozone.

One or more aspects of the exemplary embodiments also provide a vehicle air purifying apparatus by which a lifespan of an activated carbon fiber filter can be extended.

One or more aspects of the exemplary embodiments also provide a vehicle air purifying apparatus which can re-use a removable collecting electrode by cleansing the collecting electrode.

According to an aspect of an exemplary embodiment, there is provided a vehicle air purifying apparatus for simultaneously reducing harmful gas and particles, including: a charger configured to discharge positive (+) ions or negative (−) ions to charge the particles included in the harmful gas; a removable collecting electrode configured to have positive (+) or negative (−) polarity to allow at least some of the particles charged by the charger to be attached thereto; and a filter configured to filter harmful gas and/or particles that are not attached to the removable collecting electrode from among the particles charged by the charger and have positive (+) or negative (−) polarity, wherein, when the charger discharges the positive (+) ions, the removable collecting electrode has the negative (−) polarity and the filter has the positive (+) polarity, wherein, when the charger discharges the negative (−) ions, the removable collecting electrode has the positive (+) polarity and the filter has the negative (−) polarity.

According to another aspect of an exemplary embodiment, there is provided a vehicle air purifying apparatus for simultaneously reducing harmful gas and particles, including: a charger configured to discharge positive (+) ions or negative (−) ions to charge the particles included in the harmful gas; a removable collecting electrode configured to have positive (+) or negative (−) polarity to allow at least some of the particles charged by the charger to be attached thereto; and a filter configured to filter particles and/or harmful gas that are not attached to the removable collecting electrode from among the particles charged by the charger and have positive (+) or negative (−) polarity, and, wherein the filter is formed in a tubular shape having an empty space therein and the removable collecting electrode is inserted into the filter.

According to one or more exemplary embodiments, the removable collecting electrode removes particles and the filter removes harmful gas, so that the effect of simultaneously reducing the harmful gas and particles can be achieved.

According to one or more exemplary embodiments, the microfiber discharge part is used to generate high concentration ions and thus charging efficiency of gas to be processed can be enhanced and ozone is not generated.

According to one or more exemplary embodiments, particles are removed by the removable collecting electrode, so that the lifespan of the filter can be extended.

According to one or more exemplary embodiments, the collecting electrode is configured to be removable, so that the collecting electrode can be easily cleansed and reused.

According to one or more exemplary embodiments, ultra-fine particles (for example, particles of a diameter of about 0.3 μm) may also be removed.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

Exemplary embodiments described herein include their complementary embodiments. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Verification of Terms

The term "filter" used in the following description refers to an "activated carbon fiber filter", a "filter having at least part coated by activated carbon", "activated carbon", or a "filter capable of attaching harmful gas and/or particles". In the following exemplary embodiments, the filter is an activated carbon fiber filter for the purpose of explaining the present disclosure. However, the filter used in the present disclosure is not limited to the activated carbon fiber filter.

Figure 1:
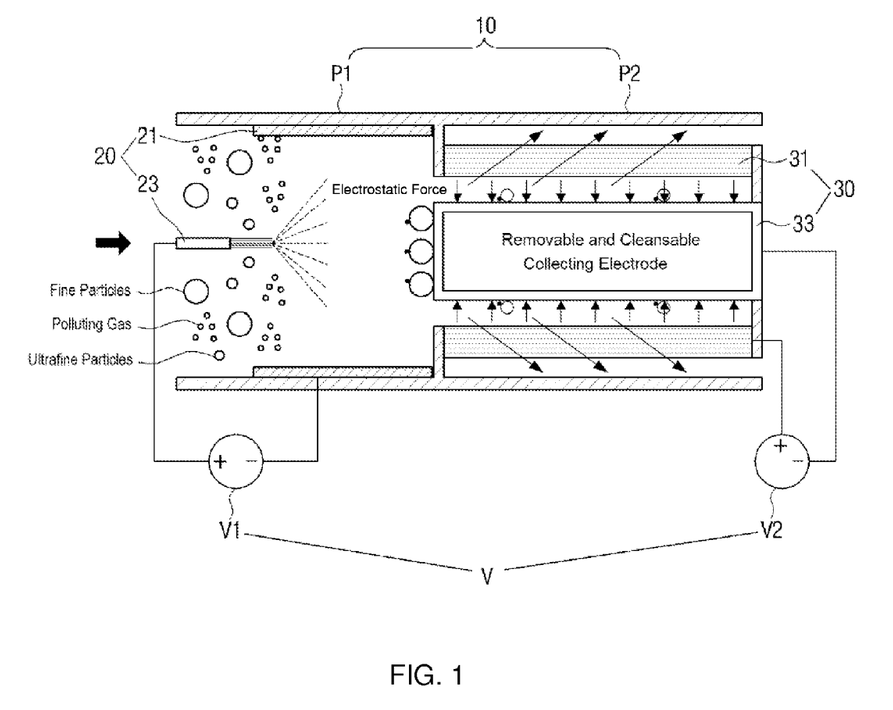
FIG. 1 is a view to illustrate a vehicle air purifying apparatus which can reduce harmful gas and particles simultaneously according to an exemplary embodiment.

FIG. 1 is a view to illustrate a vehicle air purifying apparatus which can reduce harmful gas and particles simultaneously according to an exemplary embodiment of the present disclosure.

Referring to FIG. 1, the vehicle air purifying apparatus which can reduce the harmful gas and particles simultaneously according to the present exemplary embodiment (hereinafter, referred to as the "vehicle air purifying apparatus according to the present exemplary embodiment") can remove harmful gas and particles included in air by using microfiber discharge and an activated carbon fiber filter.

The vehicle air purifying apparatus according to the present exemplary embodiment includes a body 10, a charger 20 to charge particles included in air, a filter 30 to filter harmful gas and particles, and a power supply V. The charger 20 includes a grounded part 21 and a microfiber discharge part 23, and the filter 30 includes an activated carbon fiber filter 31 and a removable collecting electrode 33.

The body 10 serves as a main frame of the vehicle air purifying apparatus according to the present exemplary embodiment, and is made of material having predetermined stiffness so as to maintain its tubular shape having an empty space therein. The tubular shape recited herein may be a cylindrical shape or a prism shape, but the present disclosure is not limited to these shapes.

The charger 20 and the filter 30 are disposed in the body 10. Although the power supply V is disposed on the outside of the body 10 in FIG. 1, the power supply V may be disposed in the body 10.

In the present exemplary embodiment, the body 10 is divided into a part P1 where the charger 20 is disposed (hereinafter, referred to as a first part) and a part P2 where the filter 30 is disposed (hereinafter, referred to as a second part).

In the present exemplary embodiment, harmful gas and particles (fine particles or ultrafine particles) to be processed pass through the charger 20 first. In this case, the particles are charged to have polarity. The particles which have passed through the charger 20 move to the filter 30. In the filter 30, the particles may be attached to the removable collecting electrode 33, and the harmful gas may be attached to the activated carbon fiber filter 31. The air from which the harmful gas and particles are removed by the filter 30 (hereinafter, referred to as purified air) is discharged to the outside.

In the present exemplary embodiment, the microfiber discharge part 23 generates positive (+) ions or negative (−) ions, and the particles passing through the charger 20 are charged with a positive (+) charge or a negative (−) charge by these ions. In FIG. 1, the microfiber discharge part 23 generates positive (+) ions for the sake of easy explanation of the present disclosure, but the microfiber discharge part 23 may be configured to generate negative (−) ions.

In the present exemplary embodiment, the microfiber discharge part 23 is made of microfiber including a carbon fiber or stainless material, and thus generates high concentration ions and does not generate ozone.

In the present exemplary embodiment, the grounded part 21 may be made of conductive material and may be grounded.

In the present exemplary embodiment, a voltage (V) is applied to maintain a predetermined potential difference between the removable collecting electrode 33 and the activated carbon fiber filter 31. When the potential difference is maintained between the removable collecting electrode 33 and the activated carbon fiber filter 31, the particles charged with the positive (+) charge or the negative (−) charge are attached to the removable collecting electrode 33.

For example, when the microfiber discharge part 23 is configured to discharge positive (+) ions, the activated carbon fiber filter 31 is configured to have positive (+) polarity and the removable collecting electrode 33 is configured to have negative (−) polarity. On the other hand, when the microfiber discharge part 23 is configured to discharge negative (−) ions, the activated carbon fiber filter 31 is configured to have negative (−) polarity and the removable collecting electrode 33 is configured to have positive (+) polarity.

In the present exemplary embodiment, the activated carbon fiber filter 31 is formed in a tubular shape and has the removable collecting electrode 33 inserted thereinto. When the activated carbon fiber filter 31 is formed in the tubular shape, the removable collecting electrode 33 may be formed in the tubular shape.

The tubular shape herein may be a cylindrical shape or a prism shape, but the present disclosure is not limited to these shapes.

The removable collecting electrode 33 formed in the tubular shape includes a side part, an upper part, and a lower part. The side part of the removable collecting electrode 33 is disposed to face the activated carbon fiber filter 31 in the proximity of the activated carbon fiber filter 31, the upper part of the removable collecting electrode 33 is disposed to face the microfiber discharge part 23, and the lower part of the removable collecting electrode 33 is disposed to be easily inserted and removed. Since the potential difference is maintained between the side part of the removable collecting electrode 33 and the activated carbon fiber filter 31 which face each other, a line of electric force starts from a side of a high electric potential and reaches the other side.

When the removable collecting electrode 33 is configured to be inserted into the activated carbon fiber filter 31, it is easy to insert and remove the removable collecting electrode 33.

As described above, when the microfiber discharge part 23 has positive (+) polarity to discharge positive (+) ions, the removable collecting electrode 33 has negative (−) polarity and the activated carbon fiber filter 31 has positive (+) polarity. On the other hand, when the microfiber discharge part 23 has negative (−) polarity to discharge negative (−) ions, the removable collecting electrode 33 has positive (+) polarity and the activated carbon fiber filter 31 has negative (−) polarity. That is, the microfiber discharge part 23 and the activated carbon fiber filter 31 have the same polarity and the removable collecting electrode 33 has the different polarity.

In the present exemplary embodiment, since the particles are attached to the surface of the removable collecting electrode 33, the removable collecting electrode 33 should be cleansed after it is used for a predetermined time. To achieve this, the removable collecting electrode 33 is configured to be removable. That is, the removable collecting electrode 33 is inserted into the activated carbon fiber filter 31 for use, and is removed from the activated carbon fiber filter 31 when it is time to cleanse and is then cleansed. Thereafter, the cleansed removable collecting electrode 33 may be used again in the vehicle air purifying apparatus according to the present exemplary embodiment.

As can be seen from FIG. 1, the particles included in air are charged to have positive (+) polarity or negative (−) polarity, and the charged particles are attached to the removable collecting electrode 33. For example, large particles from among the charged particles are attached to the upper part of the removable collecting electrode 33, whereas the other small particles are attached to the side part of the removable collecting electrode 33. The particles attached to the side part of the removable collecting electrode 33 are those attached by the line of electric force generated between the removable collecting electrode 33 and the activated carbon fiber filter 31.

According to the present exemplary embodiment as described above, the large particles are not attached to the activated carbon fiber filter 31 and are attached to the removable collecting electrode 33 first. The small particles may be attached to the removable collecting electrode 33 by a strong electric field formed between the activated carbon fiber filter 31 and the removable collecting electrode 33.

Figure 2:
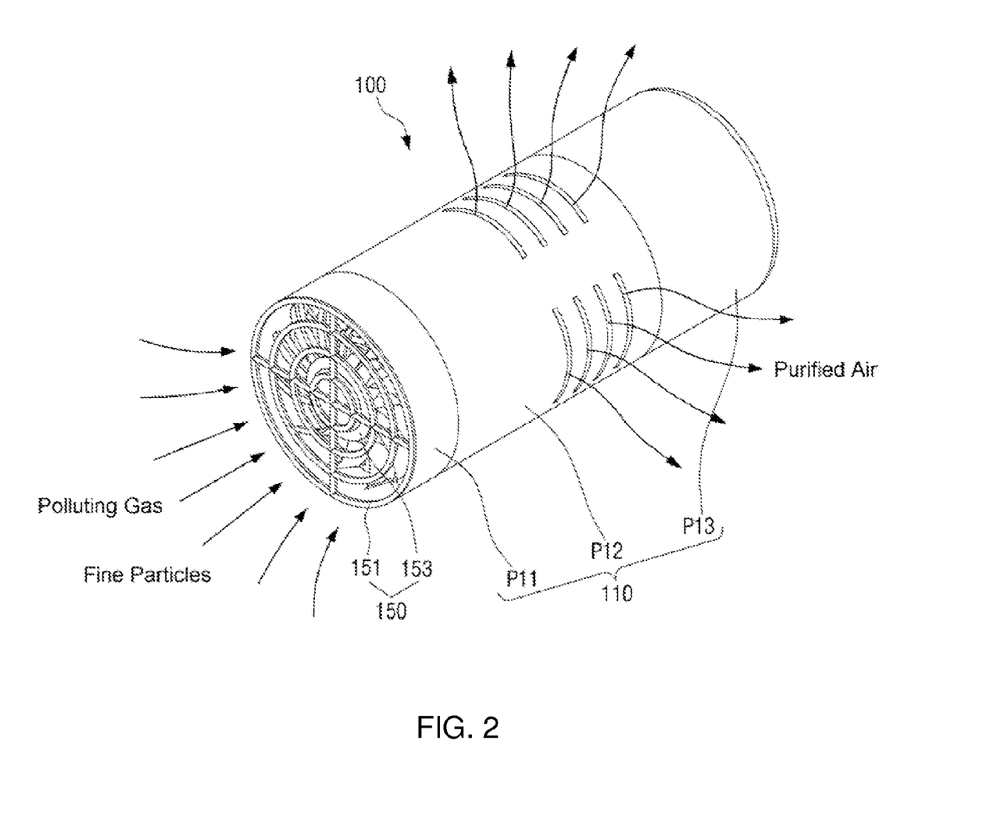
FIG. 2 is a perspective view to illustrate a vehicle air purifying apparatus which can reduce harmful gas and particles simultaneously according to an exemplary embodiment.
Figure 3:
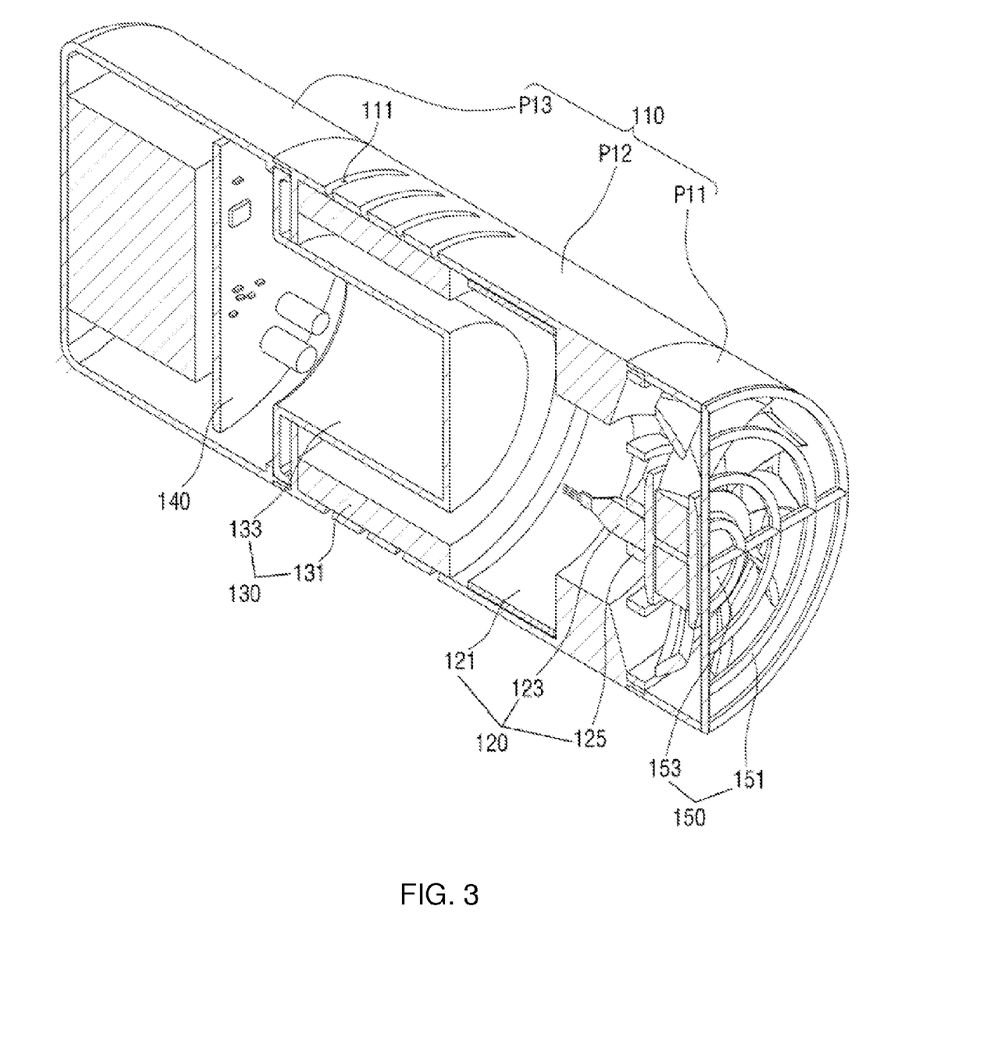
FIG. 3 is a cross sectional view to illustrate the vehicle air purifying apparatus of FIG. 2.
Figure 4:
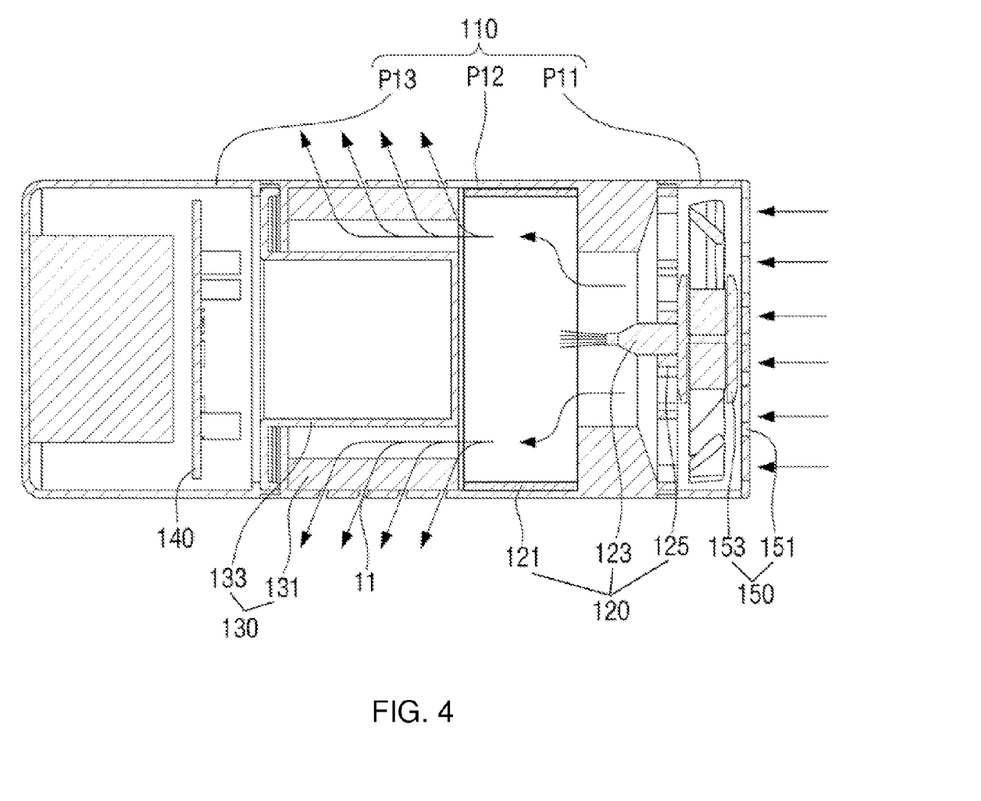
FIG. 4 is a view to illustrate an operation principle of the vehicle air purifying apparatus of FIG. 2.
Figure 5:
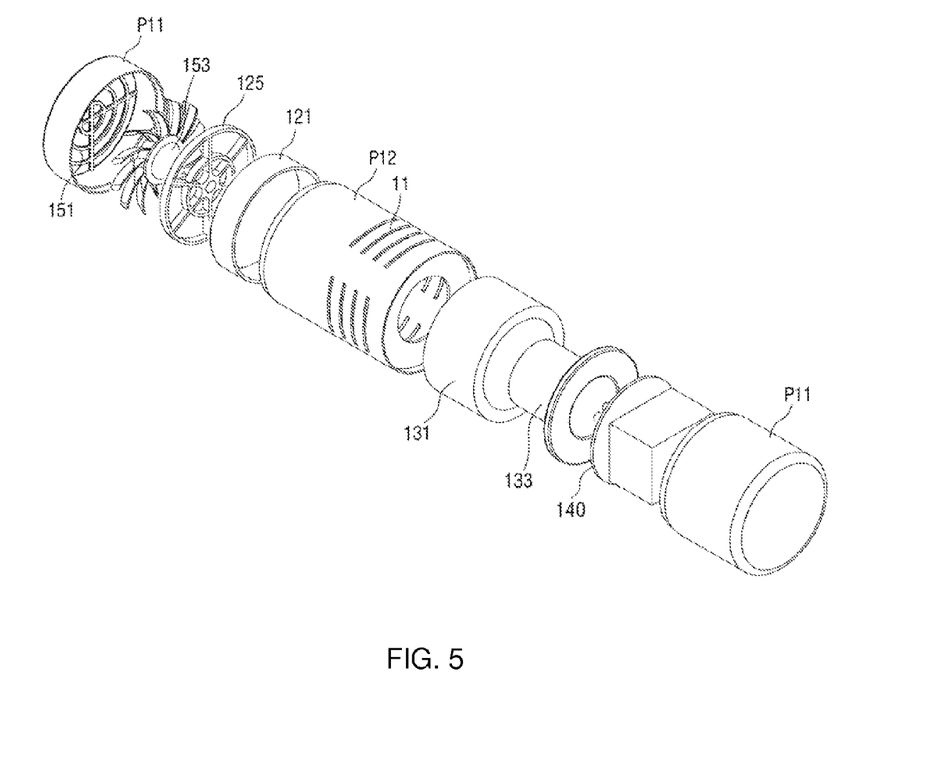
FIG. 5 is an exploded perspective view of the vehicle air purifying apparatus of FIG. 2.

FIG. 2 is a perspective view to illustrate a vehicle air purifying apparatus which can reduce harmful gas and particles simultaneously according to an exemplary embodiment, FIG. 3 is a cross sectional view to illustrate the vehicle air purifying apparatus of FIG. 2, FIG. 4 is a view to illustrate an operation principle of the vehicle air purifying apparatus of FIG. 2, and FIG. 5 is an exploded perspective view of the vehicle air purifying apparatus of FIG. 2.

Referring to FIGS. 2 to 5, the vehicle air purifying apparatus 100 according to the present exemplary embodiment includes a body 110, a charger 120 to charge particles included in air, a filter 130 to filter harmful gas and particles, a control and power unit 140, and an inlet 150. The charger 120 may include a grounded part 121, a microfiber discharge part 123, and a support part 125 to support the microfiber discharge part 123. The filter 130 may include an activated carbon fiber filter 131 and a removable collecting electrode 133. The inlet 150 may include a cover 151 and a fan 153.

The body 110 serves as a main frame of the vehicle air purifying apparatus according to the present exemplary embodiment, and the charger 120, the filter 130, and the control and power unit 140 are disposed in the body 110.

The body 110 is made of material having predetermined stiffness so as to maintain its tubular shape having an empty space therein, and the charger 120 and the filter 130 are disposed in the body 110.

In the present exemplary embodiment, the body 110 may be divided into a part P11 where the inlet 150 is disposed (hereinafter, referred to as a third part), a part P12 where the charger 120 and the filter 130 are disposed (hereinafter, referred to as a fourth part), and a part P13 where the control and power unit 140 is disposed (hereinafter, referred to as a fifth part). As shown in FIG. 5, the third part, the fourth part, and the fifth part may be removably connected with one another. Herein, a discharge outlet 111 may be formed on the fourth part P12 to discharge purified air passing through the filter 130 therethrough.

The fifth part where the control and power unit 140 is disposed is configured to be separable from the fourth part. When the fifth part is separated from the fourth part (see FIG. 5), the filter 130 disposed in the fourth part can be separated. That is, the activate carbon fiber filter 131 and the removable collecting electrode 133 of the filter 130 can be separated from each other.

In the present exemplary embodiment, the control and power unit 140 controls the other elements (for example, the body 110, the charger 120, the filter 130, and the like) and supplies power to the elements. The control and power unit 140 controls the charger 120 and the filter 130 to have appropriate polarity.

In the present exemplary embodiment, harmful gas and particles to be processed enters through the inlet 150 and passes through the charger 120. In this case, the particles are charged to have polarity. The particles which have passed through the charger 120 moves to the filter 130. In the filter 130, relatively larger particles are attached to the removable collecting electrode 133 and small particles and harmful gas are attached to the activated carbon fiber filter 131. Since the large particles are attached to the removable collecting electrode 133 rather than the activated carbon fiber filter 131 and the large particles are not attached to the activated carbon fiber filter 131, the replacement cycle for the activated carbon fiber filter 131 may be extended.

The air from which the particles and harmful gas are removed by the filter 130 is discharged to the outside.

In the present exemplary embodiment, the air which has passed through the charger 120 meets the removable collecting electrode 133 first and then moves to the activated carbon fiber filter 131.

In the present exemplary embodiment, the removable collecting electrode 133 prevents the air which has passed through the charger 120 from moving to the control and power unit 140 and guides the air to move to the activated carbon fiber filter 131.

In the present exemplary embodiment, the microfiber discharge part 123 generates positive (+) ions or negative (−) ions. The particles passing through the charger 120 are charged with a positive (+) charge or a negative (−) charge by these ions. In FIGS. 2 to 5, the microfiber discharge part 123 generates positive (+) ions for the purpose of explaining the present disclosure. However, the microfiber discharge part 123 may be configured to generate negative (−) ions.

In the present exemplary embodiment, the grounded part 121 may be made of conductive material and may be grounded.

In the present exemplary embodiment, a voltage is applied to maintain a predetermined potential difference between the removable collecting electrode 133 and the activated carbon fiber filter 131.

In the present exemplary embodiment, the activated carbon fiber filter 131 is formed in a tubular shape and has the removable collecting electrode 133 inserted thereinto. When the activated carbon fiber filter 131 is formed in the tubular shape, the removable collecting electrode 133 may be formed in the tubular shape. The removable collecting electrode 133 formed in the tubular shape includes a side part, an upper part, and a lower part. The side part of the removable collecting electrode 133 is disposed to face the activated carbon fiber filter 131 in the proximity of the activated carbon fiber filter 131, the upper part of the removable collecting electrode 133 is disposed to face the microfiber discharge part 123, and the lower part of the removable collecting electrode 133 is disposed to be easily inserted and removed. Since the potential difference is maintained between the side part of the removable collecting electrode 133 and the activated carbon fiber filter 131 which face each other, a line of electric force starts from one side and reaches the other side.

When the microfiber discharge part 123 has positive (+) polarity, the removable collecting electrode 133 has negative (−) polarity and the activated carbon fiber filter 131 has positive (+) polarity. On the other hand, when the microfiber discharge part 123 has negative (−) polarity, the removable collecting electrode 133 has positive (+) polarity and the activated carbon fiber filter 131 has negative (−) polarity. That is, the microfiber discharge part 123 and the activated carbon fiber filter 131 have the same polarity and the removable collecting electrode 133 has the different polarity.

In the present exemplary embodiment, the removable collecting electrode 133 should be cleansed. To achieve this, the removable collecting electrode 133 is configured to be removable. That is, the removable collecting electrode 133 is inserted into the activated carbon fiber filter 131 for use, and is removed from the activated carbon fiber filter 131 when it is time to cleanse and is then cleansed. Thereafter, the cleansed removable collecting electrode 133 may be used again in the vehicle air purifying apparatus according to the present exemplary embodiment.

Referring to FIG. 4, fine particles included in air (for example, air in the vehicle) are charged to have positive (+) polarity or negative (−) polarity when passing through the charger 120. Some of the charged fine particles are attached to the upper part of the removable collecting electrode 133, whereas the other fine particles are attached to the side part of the removable collecting electrode 133. The polluting gas included in the air is filtered by the activated carbon fiber filter 131.

In the exemplary embodiments described above with reference to the drawings, the activated carbon fiber filter and the removable collecting electrode are formed in the tubular shape. However, this is merely an example and the activated carbon fiber filter and the removable collecting electrode may be formed in other shapes.

In addition, in the exemplary embodiments described above with reference to FIGS. 1 to 5, the activated carbon fiber filter is used. However, this is merely an example and any kind of filter that has electrical conductivity to be able to draw particles or harmful gas thereinto may be used.

While exemplary embodiments have been particularly shown and described above, it will be understood by those of ordinary skill in the art that various changes in form and details may be made therein without departing from the spirit and scope of the present invention as defined by the following claims.

What is claimed is:

1. A vehicle air purifying apparatus for simultaneously reducing harmful gas and particles, comprising: a charger configured to discharge positive (+) ions or negative (−) ions to charge the particles included in the harmful gas; a removable collecting electrode configured to have positive (+) or negative (−) polarity to allow at least some of the particles charged by the charger to be attached thereto; and a filter configured to filter harmful gas and/or particles that are not attached to the removable collecting electrode from among the particles charged by the charger and have positive (+) or negative (−) polarity, wherein, when the charger discharges the positive (+) ions, the removable collecting electrode has the negative (−) polarity and the filter has the positive (+) polarity, wherein, when the charger discharges the negative (−) ions, the removable collecting electrode has the positive (+) polarity and the filter has the negative (−) polarity, and wherein the filter is formed in a tubular shape having an empty space therein and the removable collecting electrode is inserted into the filter.

2. The vehicle air purifying apparatus of claim 1, wherein the charger comprises a microfiber discharge part and a grounded part.

3. The vehicle air purifying apparatus of claim 1, wherein the removable collecting electrode is formed in the tubular shape comprising an upper part, a lower part, and a side part, and the side part of the removable collecting electrode is disposed to face the filter and the upper part of the removable collecting electrode is disposed to face the charger.

4. The vehicle air purifying apparatus of claim 3, further comprising:
    an inlet configured to allow air to be processed to enter therethrough; and
    a body where the inlet, the charger, the removable collecting electrode, and the filter are disposed, and
    wherein the body comprises a first part where the inlet is disposed and a second part where the charger, the removable collecting electrode, and the filter are disposed, and the first part and the second part are configured to be separable from each other.

5. The vehicle air purifying apparatus of claim 4, further comprising a control and power unit configured to control the inlet, the charger, the removable collecting electrode, and the filter, and supply power, and
    wherein the body comprises a third part where the control and power unit is disposed, and the third part is removably disposed in the proximity of the second part.

6. The vehicle air purifying apparatus of claim 5, wherein the removable collecting electrode is configured to prevent air which has passed through the charger from moving to the control and power unit and to guide the air to move to the filter.

7. A vehicle air purifying apparatus for simultaneously reducing harmful gas and particles, comprising:
- a charger configured to discharge positive (+) ions or negative (−) ions to charge the particles included in the harmful gas;
- a removable collecting electrode configured to have positive (+) or negative (−) polarity to allow at least some of the particles charged by the charger to be attached thereto; and
- a filter configured to filter particles and/or harmful gas that are not attached to the removable collecting electrode from among the particles charged by the charger and have positive (+) or negative (−) polarity, and
- wherein the filter is formed in a tubular shape having an empty space therein and the removable collecting electrode is inserted into the filter.

8. The vehicle air purifying apparatus of claim 7, wherein the removable collecting electrode is formed in the tubular shape comprising an upper part, a lower part, and a side part, and the side part of the removable collecting electrode is disposed to face the filter and the upper part of the removable collecting electrode is disposed to face the charger.

9. The vehicle air purifying apparatus of claim 8, further comprising:
- an inlet configured to allow air to be processed to enter therethrough; and
- a body where the inlet, the charger, the removable collecting electrode, and the filter are disposed, and
- wherein the body comprises a first part where the inlet is disposed and a second part where the charger, the removable collecting electrode, and the filter are disposed, and the first part and the second part are configured to be separable from each other.

10. The vehicle air purifying apparatus of claim 9, further comprising a control and power unit configured to control the inlet, the charger, the removable collecting electrode, and the filter, and supply power, and
- wherein the body comprises a third part where the control and power unit is disposed, and the third part is removably disposed in the proximity of the second part.

11. The vehicle air purifying apparatus of claim 10, wherein the removable collecting electrode is configured to prevent air which has passed through the charger from moving to the control and power unit and to guide the air to move to the filter.

* * * * *